United States Patent
Nakano et al.

(10) Patent No.: US 6,773,844 B2
(45) Date of Patent: Aug. 10, 2004

(54) PROTON CONDUCTIVE FILM AND FUEL CELL USING THE SAME

(75) Inventors: Yoshihiko Nakano, Tokyo (JP); Shuzi Hayase, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 494 days.

(21) Appl. No.: 09/947,511

(22) Filed: Sep. 7, 2001

(65) Prior Publication Data

US 2002/0061432 A1 May 23, 2002

(30) Foreign Application Priority Data

Sep. 29, 2000 (JP) ........................................ 2000-299852

(51) Int. Cl.$^7$ ................................................ H01M 8/10
(52) U.S. Cl. ........................... 429/33; 429/30; 429/309; 429/313; 429/317
(58) Field of Search ........................... 429/30, 33, 309, 429/313, 317

(56) References Cited

U.S. PATENT DOCUMENTS

| | | | | |
|---|---|---|---|---|
| 4,798,773 A | * | 1/1989 | Yasukawa et al. | 429/313 |
| 5,355,235 A | | 10/1994 | Nishizawa et al. | 359/59 |
| 5,419,984 A | * | 5/1995 | Chaloner-Gill et al. | 429/313 |
| 5,965,299 A | * | 10/1999 | Khan et al. | 429/313 |
| 5,985,513 A | | 11/1999 | Kani et al. | 430/270.1 |
| 6,004,730 A | | 12/1999 | Mikoshiba et al. | 430/325 |
| 6,022,814 A | | 2/2000 | Mikoshiba et al. | 438/788 |
| 6,025,117 A | | 2/2000 | Nakano et al. | 430/314 |
| 6,472,104 B1 | * | 10/2002 | Ulrich et al. | 429/302 |

FOREIGN PATENT DOCUMENTS

JP            9-251857           9/1997

OTHER PUBLICATIONS

Q.Deng et al.; "Novel Nafion®/ORMOSIL Hybrids via in situ Sol–Gel Reactions: 2. Probe of ORMOSIL Phase Nanostructure by 29 Si Solid State NMR Spectroscopy" Journal of Sol–Gel Science and Technology 7, 1996, pp. 177–190.

Tamaki et al., "Synthesis of Organic–Inorganic Polymer Hybrids via Ion–Ion Interaction", Polymer Preprints, Japan vol. 47, No. 14 1998, pp. 4227–4228.

* cited by examiner

*Primary Examiner*—Bruce F. Bell
(74) *Attorney, Agent, or Firm*—Oblon, Spivak, McClelland, Maier & Neustadt, P.C.

(57) ABSTRACT

Disclosed is a proton conductive film for an electrolytic membrane for a fuel cell, the proton conductive film being a composite body comprising a proton conductive polymer and a polymer represented by general formula (1) given below, or a composite body comprising a proton conductive polymer and a copolymer between a polymer represented by general formula (1) and a metal oxide represented by general formula (2) given below:

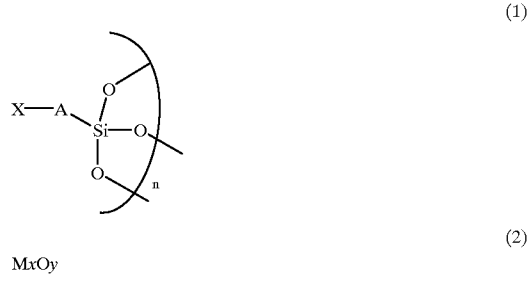

where, X represents a functional group having a nitrogen atom, A represents a substituted or unsubstituted divalent organic group, n is an integer, M is a metal selected from the group consisting of Ti, Zr, Al, B, Mo, W, Ru, Ir, Ge, Si and V, x is 1 or 2, and y is 2, 3, 4 or 5.

20 Claims, 1 Drawing Sheet

PROTON CONDUCTIVE FILM AND FUEL CELL USING THE SAME

CROSS-REFERENCE TO RELATED APPLICATIONS

This application is based upon and claims the benefit of priority from the prior Japanese Patent Application No. 2000-299852, filed Sep. 29, 2000, the entire contents of which are incorporated herein by reference.

BACKGROUND OF THE INVENTION

1. Field of the Invention

The present invention relates to a proton conductive film for an electrolytic membrane for a fuel cell and a fuel cell using the particular proton conductive film.

2. Description of the Related Art

Conventional methanol fuel cells are classified according to the feed method of the liquid fuel, into a liquid feed type and a gasified fuel supply type. In the fuel cell of the gasified fuel feed type, the electrode reaction is carried out between the electrode and the gasified fuel. As a result, it is possible to obtain a high performance with a high reactivity. On the other hand, the system is made highly complex, making it difficult to miniaturize the system.

When it comes to the fuel cell of a liquid feed type, the system is rendered relatively simple, compared with the gasified fuel feed type. However, since the electrode reaction is carried out between the electrode and the liquid fuel, the reactivity is low, leading to the problem of a low performance. The liquid fuel cell utilizing capillary force for fuel supply is also of the liquid feed type in which the fuel is supplied in a liquid state to the fuel electrode and, thus, does not require a pump or the like. Therefore, the liquid fuel cell of this type is also adaptable for miniaturization. However, the activity of the electrode reaction is low and, thus, is low in its performance.

In addition to the problems described above, the greatest problem inherent in the fuel cell is that, where a proton conductive solid polymer film such as a film of perfluorosulfonic acid available under the trade name of "Nafion" from Du Pont Inc., USA, is used as an electrolytic membrane, generated is the cross-over problem caused by the permeation of an organic liquid fuel such as methanol through the electrolytic membrane to reach the electrode of the oxidizing agent. Where the cross-over phenomenon has taken place, the supplied liquid fuel reacts directly with the oxidizing agent, resulting in failure to output the energy as the electric power. It follows that a decisive problem is generated that it is impossible to obtain a stable output.

BRIEF SUMMARY OF THE INVENTION

As described above, in the conventional fuel cell, the proton conductive solid polymer film was incapable of sufficiently suppressing the cross-over of methanol, resulting in failure to supply a stable output.

The present invention, which has been achieved in view of the situation described above, is intended to provide a proton conductive film capable of suppressing the cross-over of methanol while maintaining the proton conductivity.

The present invention is also intended to provide a fuel cell supplying a stable output.

According to a one aspect of the present invention, there is provided a proton conductive film for an electrolytic membrane for a fuel cell, the proton conductive film being a composite body comprising a proton conductive polymer and a polymer represented by general formula (1) given below:

(1)

where, X represents a functional group having a nitrogen atom, A represents a substituted or unsubstituted divalent organic group, and n is an integer.

According to another aspect of the present invention, there is provided a proton conductive film for an electrolytic membrane for a fuel cell, the proton conductive film being a composite body comprising a proton conductive polymer, and a copolymer between a polymer represented by general formula (1) given below, and a metal oxide represented by general formula (2) given below:

(1)

$MxOy$ (2)

where, X represents a functional group having a nitrogen atom, A represents a substituted or unsubstituted divalent organic group, n is an integer, M is a metal selected from the group consisting of Ti, Zr, Al, B, Mo, W, Ru, Ir, Ge, Si and V, x is 1 or 2, and y is 2, 3, 4 or 5.

According to another aspect of the present invention, there is provided a fuel cell, comprising an electrolytic membrane including a proton conductive film, which is a composite body comprising a proton conductive polymer and a polymer represented by general formula (1) given below:

(1)

where, X represents a functional group having a nitrogen atom, A represents a substituted or unsubstituted divalent organic group, and n is an integer; and a fuel electrode and an oxidizing agent electrode arranged to have the electrolytic membrane sandwiched there between.

Further, according to another aspect of the present invention, there is provided a fuel cell comprising an electrolytic membrane including a proton conductive film, which is a composite body comprising a proton conductive polymer, and a copolymer between a polymer represented by general formula (1) given below, and a metal oxide represented by general formula (2) given below:

(1)

MxOy (2)

where, X represents a functional group having a nitrogen atom, A represents a substituted or unsubstituted divalent organic group, n is an integer, M is a metal selected from the group consisting of Ti, Zr, Al, B, Mo, W, Ru, Ir, Ge, Si and V, x is 1 or 2, and y is 2, 3, 4 or 5; and a fuel electrode and an oxidizing agent electrode arranged to have the electrolyte membrane sandwiched there between.

DETAILED DESCRIPTION OF THE INVENTION

The present invention will now be described in detail.

A proton conductive film having the fluorine-containing resin represented by Nafion as the basic skeletal structure exhibits an excellent ionic conductivity. The high ionic conductivity is exhibited through the cluster network of a water containing state. Therefore, in a fuel cell using methanol, a problem is generated that methanol released from the anode is permeated into electrolytic membrane so as to pass through the cluster network. As a result, methanol is diffused into the cathode, thereby lowering the output voltage. For overcoming the problem, a crosslinked structure or the like is introduced in general into the proton conductive film so as to suppress the swelling of the proton conductive film. Where the entire film is crosslinked, however, a new problem is generated that the conductivity is markedly lowered.

The present inventors have found that the methanol permeation can be controlled by controlling the cluster network in the proton conductive film so as to control the cross-over of methanol while maintaining the proton conductivity. As a method for controlling the particular cluster network, the present inventors have found that it is possible to decrease the permeability of methanol while maintaining a high proton conductivity of the proton conductive film by forming a composite material between a specified material and the proton conductive film, arriving at the present invention.

In the proton conductive film according to one embodiment of the present invention, it is possible for the proton conductive polymer to be provided by, for example, a polystyrene-sulfonic acid copolymer, a polyvinyl-sulfonic acid copolymer, a crosslinked alkyl sulfonic acid derivative, a fluorine-containing polymer having a fluorine-containing resin skeleton and a sulfonic group, and a fluorine-containing polymer having a fluorine-containing resin skeleton and a carboxylic group. Particularly, it is most desirable for the proton conductive polymer to be provided by a polymer having at least one of a sulfonic group and a carboxylic group and a fluorine-containing resin skeleton in view of the durability, the film strength and the ionic conductivity.

The proton conductive film according to one embodiment of the present invention is formed of a composite body comprising the proton conductive polymer described above and a predetermined material including a polymer represented by general formula (1) given below:

(1)

X in general formula (1) represents a functional group having a nitrogen atom, including, for example, a substituted or unsubstituted amino group, a substituent having a heterogeneous ring having a nitrogen atom, a substituent having a cyano group, amide group, a substituent having an urea bond, a substituent having a sulfonamide bond, and a substituent including a cyclic aliphatic group having a nitrogen atom. For example, the functional group X in general formula (1) represents $NH_2$, dimethyl amino group, methyl amino group, dinitro phenyl amino group, phenyl amino group, pyridine ring, triazole ring, pyrazole ring, imidazole group, piperidine group, pyrrole group, 4,5-dihydro imidazole group, cyano group, morpholino group, azilino group, and phenyl piperadino group. Further, the functional group X can be provided by a fluorine-substituted atomic group such as trifluoromethyl group or pentafluorophenyl group, though the functional group X is not limited to these atomic groups.

The atomic group A in general formula (1) represents a substituted or unsubstituted divalent organic group such as ethylene group, trimethylene group or phenylene group, though group A is not limited to these atomic groups. Further, "n" in general formula (1) is an integer, which can be selected depending on the hydrolyzing conditions, the monomer concentration, etc. In general "n" is 3 to about $10^5$.

A salt is formed by the reaction between the lone pair of electrons of the nitrogen atom contained in the polymer represented by general formula (1) and the sulfonic group of the proton conductive polymer described above so as to obtain a complex body constituting the proton conductive film according to one embodiment of the present invention. Also, the polymer represented by general formula (1) forms a complex structure in the water-containing cluster network formed on the surface of or in the proton conductive polymer.

Incidentally, the polymer represented by general formula (1) can be synthesized by hydrolyzing a monomer represented by general formula (3) given below:

$$X\text{—}A\text{—}SiY_3 \tag{3}$$

where X represents a functional group having a nitrogen atom including, for example, a substituted or unsubstituted amino group, a substituent including a heterogeneous ring having a nitrogen atom, a substituent having a cyano group, amide group, a substituent having a urea bond, a substituent having a sulfonamide bond, and a substituent having a cyclic aliphatic group containing a nitrogen atom, A represents a substituted or unsubstituted divalent organic group, Y represents a halogen element or an alkoxy group.

To be more specific, the functional group X represents $NH_2$, dimethyl amino group, methyl amino group, dinitro phenyl amino group, phenyl amino group, pyridine ring, triazole ring, pyrazole ring, imidazole group, piperidine group, pyrrole group, cyano group, 3-morpholino group, azilino group, phenyl piperadino group, and 4,5-dihydro imidazole group, though the functional group X is not limited to these atomic groups. Further, the functional group X can be provided by a fluorine-substituted atomic group such as trifluoromethyl group or pentafluorophenyl group, though the functional group X is not limited to these atomic groups.

The atomic group A in general formula (3) represents ethylene group, trimethylene group or phenylene group, though group A is not limited to these atomic groups. Further, Y in general formula (3) represents a halogen element such as F, Cl, Br, or I, or an alkoxy group such as methoxy group, ethoxy group, propoxy group, butoxy group or a phenoxy group.

The specific compounds of the monomer represented by general formula (3) include, for example, 3-aminopropyl triethoxy silane, 4-aminobutyl trimethoxy silane, N,N-dibutyl-3-aminopropyl triethoxy silane, N-(2-aminoethyl)-3-aminopropyl trimethoxy silane, 3-(m-aminophenoxy) propyl trimethoxy silane, m-aminophenyl trimethoxy silane, bis(2-hydroxyethyl)-3-aminopropyl triethoxy silane, bis[3-(trimethoxy silyl) propyl] ethylene diamine, 3-(2,4-dinitrophenyl amino) propyl triethoxy silane, N-phenylamino propyl trimethoxy silane, N-(3-triethoxy silyl propyl)-4,5-dihydroimidazole, 3-cyanopropyl triethoxy silane, 3-morpholino propyl triethoxy silane, 3-azilinopropyl triethoxy silane, phenyl piperadino triethoxy silane, and 2-(trimethoxy silyl ethyl) pyridine. The specific compounds of the monomer represented by general formula (3) further include 3,3,3-trifluoropropyl trimethoxy silane and tridecafluoro-1,1,2,2-tetrahydrooctyl triethoxy silane, though the monomer represented by general formula (3) is not limited to the compounds exemplified above.

It is possible to obtain a complex body between the proton conductive polymer and the polymer represented by general formula (1) by using the monomer exemplified above by the method exemplified below. Specifically, a solution is prepared first by dissolving the monomer represented by general formula (3) in an organic solvent. It is desirable for the organic solvent to be a polar solvent such as alcohol, THF or formamide. Then, a film of a water-containing proton conductive polymer is dipped in the solution for the monomer impregnation, followed by drying the polymer film at room temperature.

It suffices for the concentration of the monomer solution used in this stage to be 10% or less. Where the concentration of the monomer solution exceeds 10%, it tends to be difficult to control the immersion time. It suffices for the immersion time to be not longer than one hour. Also, the immersion can be performed at room temperature, though it is acceptable to employ the heating depending on the reactivity of the monomer.

Hydrolysis proceeds even if the polymer film after the drying is left to stand under room temperature. However, if the polymer film is treated in warm water, the hydrolysis of the monomer impregnating the film is promoted, making it possible to promptly form the polymer represented by general formula (1). It is desirable for the molecular weight of the polymer thus obtained to fall within a range of between 200 and several millions in order to allow the polymer film to suppress the methanol permeation.

In the proton conductive film thus obtained, it is desirable for the content of the polymer represented by general formula (1) to fall within a range of between 0.001 parts by weight and about 10 parts by weight based on 100 parts by weight (dry weight) of the proton conductive polymer. Where the polymer content is less than 0.001 parts by weight, it is difficult to control the methanol permeation. On the other hand, if the content of the polymer represented by general formula (1) exceeds 10 parts by weight, the proton conductivity tends to be markedly lowered. Incidentally, it is more desirable for the content of the polymer represented by general formula (1) to fall within a range of between 0.01 parts by weight and about 5 parts by weight based on 100 parts by weight (dry weight) of the proton conductive polymer.

It is possible to enhance the proton conductivity of the film by doping the complex proton conductive film described above with perfluoro methane sulfonate, perfluoro acetate, phosphoric acid, an organic acid such as nitric acid and an inorganic acid. It is possible to appropriately determine the concentration of the organic acid or the inorganic acid depending on the concentration, time, etc. permeating through the film.

The proton conductive film according to another embodiment of the present invention is formed of a composite body comprising the proton conductive polymer and a specified copolymer. The copolymer used in the present invention will now be described.

The copolymer used in the present invention comprises the polymer represented by general formula (1) given below and a metal oxide represented by general formula (2) given below:

where, X represents a functional group having a nitrogen atom, A represents a substituted or unsubstituted divalent organic group, n is an integer, M is a metal selected from the group consisting of Ti, Zr, Al, B, Mo, W, Ru, Ir, Ge, Si and V, x is 1 or 2, and y is 2, 3, 4 or 5.

The copolymer can be synthesized by preparing first a solution containing a metal alkoxide represented by general formula (4) given below and the monomer represented by general formula (3) given previously, followed by allowing the proton conductive film to be impregnated with the resultant solution as described above and subsequently carrying out the hydrolysis:

$$M(OR)_m \tag{4}$$

where m is a positive integer, which is determined in accordance with M, R is a substituted or unsubstituted hydrocarbon group such as methyl group, ethyl group, propyl group, butyl group or phenyl group, and M is a metal selected from the group consisting of Ti, Zr, Al, B, Mo, W, Ru, Ir, Ge, Si and V.

The copolymer described above is formed by hydrolysis between the alkoxide represented by general formula (4) and the monomer represented by general formula (3). The molecular weight of the copolymer, which is not particularly defined, should fall within a range of between 200 and several millions as described previously.

The metal alkoxide represented by general formula (4) includes, for example, $Si(OCH_3)_4$, $CH_3Si(OCH_3)_3$, $Si(OCH_2CH_3)_4$, $(CH_3O)_3Si-(CH_2)_2-Si(OCH_3)_3$, $HSi(OCH_3)_3$, $(CH_3O)_3Si-(CH_2)_2-SO_3CH_2CH_3$, $CF_3CH_2CH_2Si(OCH_3)_3$, $Zr(OCH(CH_3)_2)_4$, $Ge(OC_2H_5)_4$, $Ti(O(CH_2)_3CH_3)_4$, $Al(OCH(CH_3)_2)_4$, $B(O(CH_2)_3CH_3)_3$, $W(OC_2H_5)_6$, $VO(I-OC_3H_7)_3$, $Mo(OC_2H_5)_5$, $Ru(OC_4H_9)_3$, and $Ir(OC_4H_9)_3$, though the metal alkoxide used in the present invention is not limited to the compounds exemplified above.

The polymer having a repeating unit represented by general formula (1) is formed with the copolymer formed by the hydrolysis between the metal alkoxide exemplified above and the monomer represented by general formula (3) given previously. It is desirable for the mixing ratio of the copolymer noted above to fall within a range of between 1 and 500 parts by weight relative to 100 parts by weight of the polymer having the repeating unit represented by general formula (1). If the mixing ratio of the copolymer exceeds 500 parts by weight, the effect of suppressing the methanol permeability tends to be impaired. Incidentally, where the metal of the metal alkoxide is not Si alkoxide, it is desirable to add a small amount of diols, β-diketones, β-keto esters as the reaction inhibitor because the hydrolyzing reaction proceeds at a very high rate so as to suppress the formation of the copolymer.

In the proton conductive film according to one embodiment of the present invention, it is desirable for the content of the copolymer obtained by the reaction between the polymer represented by general formula (1) and the metal oxide represented by general formula (2) to fall within a range of between 0.001 parts by weight and about 60 parts by weight based on 100 parts by weight (dry weight) of the proton conductive polymer. If the copolymer content is lower than 0.001 parts by weight, it is difficult to control the methanol permeability. On the other hand, if the content of the copolymer obtained by the reaction between the polymer represented by general formula (1) and the metal oxide represented by general formula (2) exceeds 60 parts by weight, the proton conductivity tends to be markedly lowered. Incidentally, it is more desirable for the content of the copolymer to fall within a range of between 0.01 parts by weight and about 30 parts by weight relative to 100 parts by weight (dry weight) of the proton conductive polymer.

The methanol fuel cell used in the one embodiment of the present invention will now be described with reference to the accompanying drawings.

Figure 1:
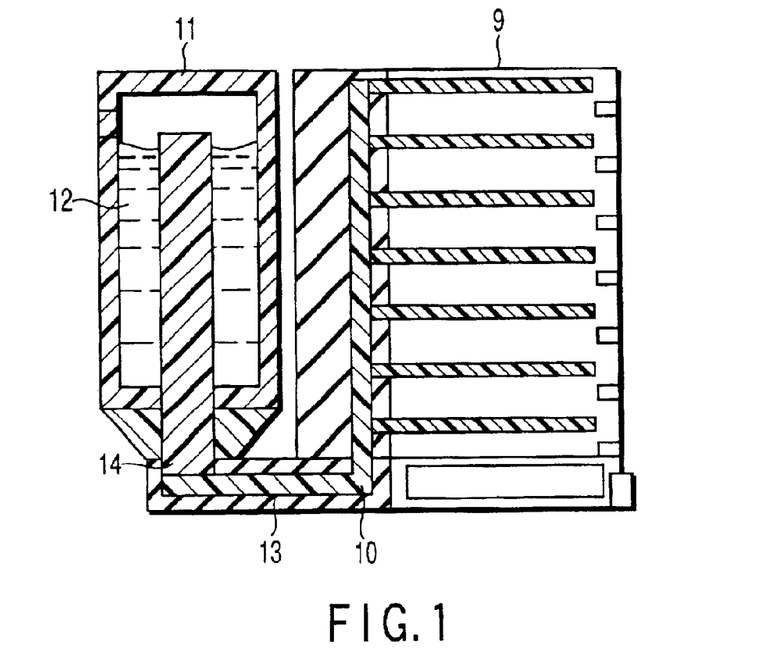
FIG. 1 schematically shows, as an example, the construction of a methanol fuel cell according to one embodiment of the present invention.

FIG. 1 schematically shows the construction of a fuel cell according to one embodiment of the present invention. As shown in the drawing, the fuel cell basically comprises a stacked body 9, a fuel storage tank 11 housing a liquid fuel 12, and a supply pipe 13 for supplying a liquid fuel from the fuel storage tank 11 into the stacked body 9. The liquid fuel is introduced into each unit cell constituting the stacked body 9 through a liquid fuel introducing port 10.

Figure 2:
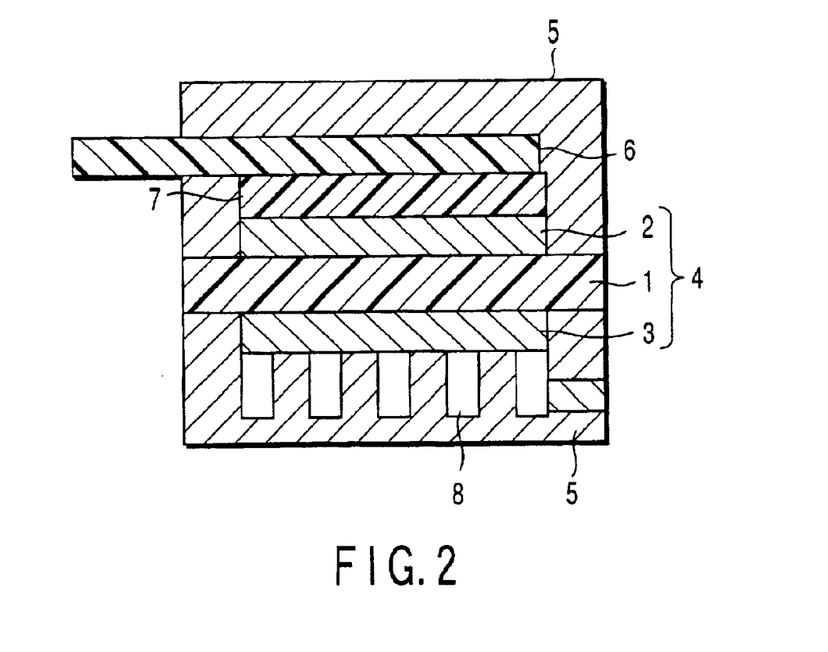
FIG. 2 schematically shows the construction of a unit cell included in the stacked body of the methanol fuel cell according to the embodiment of the present invention.

FIG. 2 is a cross sectional view showing the gist portion of each unit cell constituting the stacked body 9. In the unit cell shown in FIG. 2, an electrolyte plate 1 is held between a fuel electrode (anode) 2 and an oxidizing agent electrode (cathode) 3. The electrolyte plate 1, fuel electrode 2 and oxidizing agent electrode 3 collectively form an electromotive section 4. Each of the fuel electrode 2 and the oxidizing agent electrode 3 is formed of a conductive porous body to permit circulation of the fuel and the oxidizing agent gas and to conduct electrons.

Further, a fuel permeating section 6 performing the function of holding the liquid fuel and a fuel evaporating section 7 for guiding a gaseous fuel formed by evaporation of the liquid fuel held by the fuel permeating section 6 are arranged adjacent to the fuel electrode 2 in each unit cell. The unit cells each comprising the fuel permeating section 6, the fuel evaporating section 7 and the electromotive section 4 are staked one upon the other with a separator 5 interposed there between so as to form the stacked type fuel cell 8 constituting the cell body. Also, an oxidizing agent gas supply groove 8 for allowing an oxidizing agent gas to flow is formed as a continuous groove is formed in that surface of the separator 5 which faces the oxidizing agent electrode 3.

Incidentally, as a means for supplying a liquid fuel from the fuel storage tank 11 shown in FIG. 1 into the fuel permeating section 6 of the unit cell, it is conceivable to form the liquid fuel introducing section 10 joined to the fuel tank on at least one side surface of, for example, the stacked body 8 in a manner to extend along the particular side surface. The liquid fuel introduced into the liquid fuel introducing section 10 is supplied from the side surface of the stacked body 9 into the fuel permeating section 6 and, then, evaporated in the fuel evaporating section 7 so as to be supplied onto the fuel electrode 2. In this case, it is possible to supply the liquid fuel into the fuel permeating section 6 by capillary action without using auxiliary equipment, if the fuel permeating section is formed of a material exhibiting the capillary phenomenon. For allowing the liquid fuel to be supplied to the fuel permeating section 6 by capillary action, it is necessary for the liquid fuel introduced into the liquid fuel introducing section 10 to be in direct contact with one end of the fuel permeating section 6. It is also necessary for the region between the liquid fuel introducing portion 10 and the stacked body 9 to be insulated except that the fuel permeating section 6 is connected, though the particular region is omitted in FIG. 1.

Incidentally, where the stacked body 9 is formed by stacking the unit cells as shown in FIG. 1, each of the separator 5, the fuel permeating section 6 and the fuel evaporating section 7 also performs the function of a current collecting plate for transmitting the generated electrons and, thus, is formed of a conductive material such as a porous body containing carbon. Further, a stratum-like, an island-like or granular catalyst layer is formed as required between the fuel electrode 2 and the electrolyte plate 1 and between the oxidizing agent electrode 3 and the electrolyte plate 1.

It is also possible for the fuel electrode 2 itself and the oxidizing agent electrode 3 itself to perform the function of a catalyst electrode. It is possible for the catalyst electrode to be of a single layer structure containing a catalyst layer alone or of a multi-layered structure comprising a substrate such as a conductive paper or cloth and a catalyst layer formed on the substrate.

As described above, the separator 5 included in the unit cell shown in FIG. 2 also performs the function of a channel allowing the flow of the oxidizing agent gas. By using a part 5 performing the functions of both the separator and the channel, i.e., a channeling-separator 5, the number of parts used can be decreased so as to further miniaturize the fuel cell. It is also possible to use an ordinary channel in place of the separator 5.

For supplying a liquid fuel from the fuel storage tank 11 into the liquid fuel introducing section 10, the liquid fuel housed in the fuel storage tank is subjected to, for example, free fall so as to be introduced into the liquid fuel introducing section 10. This method permits introducing the liquid fuel into the liquid fuel introducing section 10 without fail, though there is a structural limitation that the fuel storage tank must be positioned higher than the upper surface of the stacked body 9. It is also possible for the liquid fuel to be sucked from the fuel storage tank 11 by the capillary force of the liquid fuel introducing section 10. If this method is employed, it is unnecessary to make the connecting point between the fuel storage tank 11 and the liquid fuel introducing portion 10, i.e., position of the fuel inlet port formed in the liquid fuel introducing section 10, higher than the upper surface of the stacked body 9. It follows that, if the particular method is combined with, for example, the free fall method, it is possible to obtain a merit that the installing position of the fuel storage tank 11 can be set freely.

It should be noted, however, that, in order to smoothly supply the liquid fuel, which is introduced into the liquid fuel introducing section 10 by the capillary action, into the fuel permeating portion 6 by the capillary action, it is desirable for the force of the capillary action produced by the fuel permeating section 6 to be set greater than the force of the capillary action produced in the liquid fuel introducing section 10. Incidentally, in the embodiment shown in the drawing, only one liquid fuel introducing section 10 is arranged along the side surface of the stacked body 9. However, it is also possible to form another liquid fuel introducing section 10 along the other side surface of the stacked body 9.

The fuel storage tank 11 described above can be made detachable from the stacked cell body 9. As a result, the cell can be operated for a long time by replacing the fuel storage tank. Also, the liquid fuel can be supplied from the fuel storage tank 11 into the liquid fuel introducing section 10 by utilizing free fall as described above, by setting a high internal pressure within the fuel storage tank 11 so as to push out the liquid fuel, or by sucking out the fuel by utilizing the capillary action of the liquid fuel introducing section 10.

As described above, the liquid fuel introduced into the liquid fuel introducing section 10 is supplied into the fuel permeating section 6. The kind of fuel permeating section 6 is not particularly limited as far as the fuel permeating section 6 is capable of holding the liquid fuel inside the fuel permeating section 6 and is capable of supplying the evaporated fuel alone into the fuel electrode 2 though the fuel evaporating section 7. For example, it is possible for the fuel permeating section 6 to include a gas-liquid separating membrane, which acts as a liquid fuel passageway, at the interface with the fuel evaporating section 7. Further, where a liquid fuel is supplied to the fuel permeating section 6 by capillary action, the kind of fuel permeating section 6 is not particularly limited as far as the liquid fuel is capable of passing through the fuel permeating section 6 by capillary action. For example, it is possible for the fuel permeating section 6 to be formed of a porous body comprising particles or a filler, a unwoven fabric prepared by the paper-making method, a woven fabric prepared by weaving fibers, and small clearances formed between the fuel permeating section 6 and a plate made of glass or a plastic material.

In the case where a porous body is used for forming the fuel permeating section 6, the capillary action of the porous body itself forming the fuel permeating section 6 can be utilized for sucking the liquid fuel into the fuel permeating section 6. In the case of utilizing capillary action, prepared is an open cell structure in which pores of the fuel permeating section 6 made of a porous body are continuous and the pore diameter is controlled. It should be noted that the open cell is allowed to extend from the side surface of the fuel permeating section 6 of the liquid fuel introducing section 10 to reach at least the other surface, with the result that the liquid fuel can be smoothly supplied in the lateral direction by capillary action.

The pore diameter of the porous body used for forming the fuel permeating section 6 is not particularly limited, as far as the fuel permeating section 6 is capable of sucking the liquid fuel from within the liquid fuel introducing section 10. However, it is desirable for the pore diameter to fall within a range of between about 0.01 $\mu$m and 150 $\mu$m in view of the force of the capillary action of the liquid fuel introducing section 10. It is also desirable for the volume of the pores, which provides the index of the pore continuity within the porous body, to fall within a range of between about 20% and 90%. If the pore diameter is smaller than 0.01 $\mu$m, it is difficult to manufacture the fuel permeating section 6. On the other hand, if the pore diameter exceeds 150 $\mu$m, the capillary action tends to be weakened. Also, if the volume of the pore is smaller than 20%, the amount of the open cell is decreased, with the amount of the closed cell increased, resulting in failure to obtain a sufficient capillary action. On the other hand, if the volume of the pore exceeds 90%, the amount of the open cell is certainly increased. However, the mechanical strength of the fuel permeating section 6 is lowered so as to make it difficult to manufacture the fuel permeating section 6. In practice, it is desirable for the pore diameter to fall within a range of between 0.5 $\mu$m and 100 $\mu$m and for the pore volume to fall within a range of between 30% and 75%.

The present invention will now be described in further detail with reference to the Examples. Needless to say, the technical scope of the present invention is not limited by the Examples which follow.

EXAMPLE 1

Sample 1-1

Sample 1-1 of a proton conductive film was prepared as follows.

In the first step, prepared was a Nafion film (Nafion 117@ film) available on the market and having a thickness of 190 $\mu$m as a film made of a proton conductive polymer. The Nafion film thus prepared was treated for one hour in a boiling water, followed by dipping the Nafion film in a 10% nitric acid for several hours. Further, after a sufficient washing with pure water, the treated Nafion film was stored in pure water.

On the other hand, prepared was a 1.0% methanol solution of 3-aminopropyl triethoxy silane as a solution of the monomer represented by general formula (3) given previously.

The Nafion film was taken out of the pure water and, after the water on the film surface was sufficiently absorbed by a filter paper, the Nafion film was dipped for one minute in the monomer solution at room temperature, followed by drying at room temperature. Further, the dried film was treated for one hour in a boiling water for carrying out the hydrolysis, thereby obtaining sample 1-1 of a proton conductive film.

Sample 1-2

Sample 1-2 was prepared as in the preparation of sample 1-1, except that the dipping time in the monomer solution was changed to 3 minutes.

Sample 1-3

Sample 1-3 was prepared as in the preparation of sample 1-1, except that the dipping time in the monomer solution was changed to 5 minutes.

Sample 1-4

Sample 1-4 was prepared as in the preparation of sample 1-1, except that the dipping time in the monomer solution was changed to 10 minutes.

Sample 2

Sample 2 was prepared as in the preparation of sample 1-1, except that 0.5% methanol solution of N-(2-aminoethyl)-3-aminopropyl trimethoxy silane was substituted for the 1.0% methanol solution of 3-aminopropyl triethoxy silane used in the preparation of sample 1-1, and that the dipping time in the monomer solution was changed to 2 minutes.

Sample 3

Sample 3 was prepared as in the preparation of sample 1-3, except that 3-(m-aminophenoxy) propyl triethoxy silane was substituted for 3-aminopropyl triethoxy silane used in the preparation of sample 1-3.

Sample 4

Sample 4 was prepared as in the preparation of sample 1-3, except that m-aminophenyl triethoxy silane was substituted for 3-aminopropyl triethoxy silane used in the preparation of sample 1-3.

Sample 5

Sample 5 was prepared as in the preparation of sample 1-3, except that bis-2-(hydroxyethyl)-3-aminopropyl triethoxy silane was substituted for 3-aminopropyl triethoxy silane used in the preparation of sample 1-3.

Sample 6

Sample 6 was prepared as in the preparation of sample 2, except that a 0.5% methanol solution of bis[3-(trimethoxy silyl) propyl] ethylene diamine was substituted for a 0.5% methanol solution of N-(2-aminoethyl)-3-aminopropyl triethoxy silane used in the preparation of sample 2.

Sample 7

Sample 7 was prepared as in the preparation of sample 1-3, except that 3-(2,4-dinitrophenyl amino) propyl triethoxy silane was substituted for 3-aminopropyl triethoxy silane used in the preparation of sample 1-3.

Sample 8

Sample 8 was prepared as in the preparation of sample 1-3, except that N-phenylamino propyl trimethoxy silane was substituted for 3-aminopropyl triethoxy silane used in the preparation of sample 1-3.

Sample 9

Sample 9 was prepared as in the preparation of sample 1-3, except that N-(3-triethoxy silyl propyl)-4,5-dihydroimidazole was substituted for 3-aminopropyl triethoxy silane used in the preparation of sample 1-3.

Sample 10

Sample 10 was prepared as in the preparation of sample 1-3, except that 2-(trimethoxy silyl ethyl) pyridine was substituted for 3-aminopropyl triethoxy silane used in the preparation of sample 1-3.

Sample 11

Sample 11 was prepared as in the preparation of sample 1-2, except that a Nafion film 1135 was substituted for the Nafion film 117 used in the preparation of sample 1-2.

Sample 12

Sample 12 was prepared as in the preparation of sample 1-2, except that a Nafion film 1035 was substituted for the Nafion film 117 used in the preparation of sample 1-2.

Sample 13

A sample was prepared by the procedure equal to that employed in preparing sample 1-3, followed by dipping the resultant sample in about 10% sulfuric acid, followed by washing the sample with water and subsequently doping the washed sample with an acid so as to prepare sample 13 of a proton conductive film.

Sample 14

Prepared was 3-aminopropyl triethoxy silane as a monomer represented by general formula (3) referred to previously. Also prepared was tetraethoxy silane as a metal alkoxide represented by general formula (4) referred to previously. Then, a solution was prepared by dissolving 0.5 g of each of these monomer and metal alkoxide in 99 g of methanol.

On the other hand, the Nafion film referred to previously was taken out of the pure water and, after the water on the surface of Nafion film was sufficiently absorbed by a filter paper, the Nafion film was dipped for 5 minutes in the solution containing the monomer and the metal alkoxide under room temperature, followed by drying the film at room temperature. The film after the drying was treated in a boiling water for one hour so as to carry out the hydrolysis, thereby obtaining sample 14 of a proton conductive film.

Sample 15

Prepared was 3-aminopropyl triethoxy silane as a monomer represented by general formula (3). Also prepared was titanium n-propoxide as a metal alkoxide represented by general formula (4). Then, a solution was prepared by dissolving 0.5 g of each of these monomer and metal alkoxide in a mixed solvent comprising 90 g of methanol and 9 g of acetoxy ethyl acetate.

On the other hand, the Nafion film referred to previously was taken out of the pure water and, after the water on the surface of Nafion film was sufficiently absorbed by a filter paper, the Nafion film was dipped for 5 minutes in the solution containing the monomer and the metal alkoxide under room temperature, followed by drying the film at room temperature. The film after the drying was treated in a boiling water for one hour so as to carry out the hydrolysis, thereby obtaining sample 15 of a proton conductive film.

Sample 16

A sample 16 of a proton conductive film was prepared as in sample 1-3, except that 3-cyanopropyl triethoxy silane was substituted for 3-aminopropyl triethoxy silane used in the preparation of sample 1-3.

Sample 17

A sample 17 of a proton conductive film was prepared as in sample 1-2, except that (3,3,3-trifluoropropyl) trimethoxy silane was substituted for 3-aminopropyl triethoxy silane used in the preparation of sample 1-2.

Sample 18

A sample 18 of a proton conductive film was prepared as in sample 1-1, except that 3-morpholinopropyl trimethoxy silane was substituted for 3-aminopropyl triethoxy silane used in the preparation of sample 1-1.

Sample 19

A sample 19 of a proton conductive film was prepared as in sample 1-2, except that 3-(triethoxy silyl propyl)-1'-nitrobenzamide was substituted for 3-aminopropyl triethoxy silane used in the preparation of sample 1-2.

Sample 20

A sample 20 of a proton conductive film was prepared as in sample 1-2, except that 3-isocyanate propyl triethoxy silane was substituted for 3-aminopropyl triethoxy silane used in the preparation of sample 1-2.

Sample 21

A sample 21 of a proton conductive film was prepared as in sample 1-1, except that N-(3-(triethoxy silyl) propyl)-2-carbomethoxy aziridine was substituted for 3-aminopropyl triethoxy silane used in the preparation of sample 1-1.

Sample 22

A sample 22 of a proton conductive film was prepared as in sample 1-1, except that tris (3-triethoxy silyl propyl) isocyanurate was substituted for 3-aminopropyl triethoxy silane used in the preparation of sample 1-1.

Sample 23

A sample 23 of a proton conductive film was prepared as in sample 1-1, except that N-(triethoxy silyl propyl) naphthyl sulfonamide was substituted for 3-aminopropyl triethoxy silane used in the preparation of sample 1-1.

EXAMPLE 2

The methanol permeability and the electrical resistance were measured in respect of the proton conductive films obtained in Example 1.

Specifically, two circular cells each having a diameter of 30 mm were prepared. A 10% methanol solution was housed in one of these two circular cells, with pure water housed in the other circular cell. A proton conductive high molecular weight film was held between these two cells and left to stand at room temperature for a predetermined time. Then, the methanol concentration of the cell housing the pure water was measured by a gas chromatography so as to evaluate the methanol permeability.

The sample film was taken out of the pure water a predetermined time later, and the methanol permeability was measured after water was removed from the sample film. The methanol permeability thus measured is given in Table 1 as a relative value with the methanol permeability through Nafion being set at 1.

Also prepared were two square cells each having an area of 10 cm$^2$, and a platinum electrode was attached to one side of one of these two cells. The proton conductive film was held between these two square cells, and a resistance value was measured by an alternating current method, in which the resistance was measured by an impedance analyzer at 1 kHz, so as to obtain the electrical resistance of the film. Table 1 also shows the result.

Further, the methanol permeability and the electrical resistance were measured similarly in respect of each of Nafion 117, Nafion 1135 and Nafion 1035, with the result as shown in Table 2.

TABLE 1

| Film | Relative methanol permeability | Relative film resistance |
|---|---|---|
| Sample 1-1 | 0.68 | 1.8 |
| Sample 1-2 | 0.48 | 3.0 |
| Sample 1-3 | 0.18 | 4.1 |
| Sample 1-4 | 0.02 | 10.5 |
| Sample 2 | 0.20 | 2.3 |
| Sample 3 | 0.41 | 1.8 |
| Sample 4 | 0.35 | 2.0 |
| Sample 5 | 0.45 | 1.9 |
| Sample 6 | 0.14 | 3.0 |
| Sample 7 | 0.21 | 1.5 |
| Sample 8 | 0.25 | 2.6 |
| Sample 9 | 0.23 | 2.0 |
| Sample 10 | 0.38 | 1.9 |

TABLE 2

| Film | Relative methanol permeability | Relative film resistance |
|---|---|---|
| Sample 11 | 0.16 | 2.2 |
| Sample 12 | 0.15 | 2.4 |
| Sample 13 | 0.35 | 3.5 |
| Sample 14 | 0.31 | 3.0 |
| Sample 15 | 0.29 | 2.5 |
| Sample 16 | 0.41 | 1.3 |
| Sample 17 | 0.38 | 1.5 |
| Sample 18 | 0.31 | 2.1 |
| Sample 19 | 0.24 | 2.3 |
| Sample 20 | 0.23 | 2.6 |
| Sample 21 | 0.31 | 1.9 |
| Sample 22 | 0.25 | 1.8 |
| Sample 23 | 0.35 | 1.5 |
| (Comparative Example 1) Nafion 117 | 1.00 | 1.0 |
| (Comparative Example 2) Nafion 1135 | 1.23 | 0.75 |
| (Comparative Example 3) Nafion 1035 | 1.22 | 0.85 |

As is apparent from Tables 1 and 2, the electrical resistance (impedance) of the proton conductive film of the present invention (samples 1–1 to 20) comprising a complex body of a predetermined polymer or copolymer is only several times higher than that of the Nafion film. This indicates that the proton conductive film of the present invention permits markedly lowering the methanol permeability while maintaining the proton conductivity to some extent.

EXAMPLE 3

Each of a cathode electrode containing platinum as a catalyst in an amount of 4 mg/cm$^2$, which was manufactured by E-tech Inc., and an anode electrode containing Pt—Ru as a catalyst in an amount of 4 mg/cm$^2$ was impregnated with a 5% Nafion solution.

The film of sample 11, which was prepared in Example 1, was held between these two electrodes as a proton conductive high molecular weight solid film so as to obtain a laminate structure. The resultant laminate structure was compressed under heating at 125° C. and under a pressure of 100 kg/cm² for 5 minutes so as to obtain an electrode composite body. Further, the electrode composite body was incorporated between a carbon cell provided with a fuel supply port and another carbon cell provided with an air introducing port with a Teflon film used as a sealing material, thereby preparing a fuel cell.

A 10 M methanol aqueous solution was supplied as a fuel to the fuel cell, and air was also supplied to the fuel cell. Under this condition, both surfaces of the cell were heated to 40° C. so as to obtain an electric current of 10 mA/cm², thereby examining the stability with time of the fuel cell performance. The output of the fuel cell was found to be stable even several hours later.

COMPARATIVE EXAMPLE 4

Each of a cathode electrode containing platinum as a catalyst in an amount of 4 mg/cm², which was manufactured by E-tech Inc., and an anode electrode containing Pt—Ru as a catalyst in an amount of 4 mg/cm² was impregnated with a 5% Nafion solution.

A Nafion 117 film manufactured by Du Pont Inc. was held between these two electrodes as a proton conductive high molecular weight solid film so as to obtain a laminate structure. The resultant laminate structure was compressed under heating at 125° C. and under a pressure of 100 kg/cm² for 5 minutes so as to obtain an electrode composite body. Further, the electrode composite body was incorporated between a carbon cell provided with a fuel supply port and another carbon cell provided with an air introducing port with a Teflon film used as a sealing material, thereby preparing a fuel cell.

A 10 M methanol aqueous solution was supplied as a fuel to the fuel cell, and air was also supplied to the fuel cell. Under this condition, both surfaces of the cell were heated to 40° C. so as to obtain an electric current of 10 mA/cm², thereby examining the stability with time of the fuel cell performance. The output of the fuel cell ceased to be obtained in only several minutes.

As described above in detail, the present invention provides a proton conductive film for an electrolytic membrane for a fuel cell, which permits suppressing the cross-over of methanol while maintaining the proton conductivity.

The present invention also provides a fuel cell capable of producing a stable output.

The present invention makes it possible to provide a fuel cell small in size, high in performance, and capable of supplying a stable output and, thus, has a markedly high industrial value.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A proton conductive film for an electrolytic membrane for a fuel cell, said proton conductive film being a composite body comprising a proton conductive polymer and a polymer represented by general formula (1) given below:

(1)

where, X represents a functional group having a nitrogen atom, A represents a substituted or unsubstituted divalent organic group, and n is an integer.

2. The proton conductive film according to claim 1, wherein said proton conductive polymer is a polymer having at least one of a sulfonic group and a carboxylic group and a fluorine-containing resin skeleton.

3. The proton conductive film according to claim 1, wherein said proton conductive film is doped with an acid.

4. The proton conductive film according to claim 1, wherein the amount of the polymer represented by general formula (1) falls within a range of between 0.001 parts by weight and 10 parts by weight relative to 100 parts by weight on the dry basis of said proton conductive polymer.

5. The proton conductive film according to claim 1, wherein the amount of the polymer represented by general formula (1) falls within a range of between 0.01 parts by weight and 5 parts by weight relative to 100 parts by weight on the dry basis of said proton conductive polymer.

6. A proton conductive film for an electrolytic membrane for a fuel cell, said proton conductive film being a composite body comprising a proton conductive polymer, and a copolymer between a polymer represented by general formula (1) given below, and a metal oxide represented by general formula (2) given below:

(1)

MxOy (2)

where, X represents a functional group having a nitrogen atom, A represents a substituted or unsubstituted divalent organic group, n is an integer, M is a metal selected from the group consisting of Ti, Zr, Al, B, Mo, W, Ru, Ir, Ge, Si and V, x is 1 or 2, and y is 2, 3, 4 or 5.

7. The proton conductive film according to claim 6, wherein said proton conductive polymer is a polymer having at least one of a sulfonic group and a carboxylic group and a fluorine-containing resin skeleton.

8. The proton conductive film according to claim 6, wherein said proton conductive film is doped with an acid.

9. The proton conductive film according to claim 6, wherein the amount of the copolymer between the polymer represented by general formula (1) and the metal oxide represented by general formula (2) falls within a range of between 0.001 parts by weight and 60 parts by weight relative to 100 parts by weight on the dry basis of said proton conductive polymer.

10. The proton conductive film according to claim 6, which contains the polymer represented by general formula (1), the amount of said copolymer falling within a range of between 1 part by weight and 500 parts by weight relative to 100 parts by weight of said polymer.

11. A fuel cell, comprising:

an electrolytic membrane including a proton conductive film, which is a composite body comprising a proton conductive polymer and a polymer represented by general formula (1) given below:

(1)

where, X represents a functional group having a nitrogen atom, A represents a substituted or unsubstituted divalent organic group, and n is an integer; and a fuel electrode and an oxidizing agent electrode arranged to have said electrolytic membrane sandwiched therebetween.

12. The fuel cell according to claim 11, wherein said proton conductive polymer is a polymer having at least one of a sulfonic group and a carboxylic group and a fluorine-containing resin skeleton.

13. The fuel cell according to claim 11, wherein said proton conductive film is doped with an acid.

14. The fuel cell according to claim 11, wherein the amount of the polymer represented by general formula (1) falls within a range of between 0.001 parts by weight and 10 parts by weight relative to 100 parts by weight on the dry basis of said proton conductive polymer.

15. The fuel cell according to claim 11, wherein the amount of the polymer represented by general formula (1) falls within a range of between 0.01 parts by weight and 5 parts by weight relative to 100 parts by weight on the dry basis of said proton conductive polymer.

16. A fuel cell comprising:

an electrolytic membrane including a proton conductive film, which is a composite body comprising a proton conductive polymer, and a copolymer between a polymer represented by general formula (1) given below, and a metal oxide represented by general formula (2) given below:

(1)

(2)

MxOy where, X represents a functional group having a nitrogen atom, A represents a substituted or unsubstituted divalent organic group, n is an integer, M is a metal selected from the group consisting of Ti, Zr, Al, B, Mo, W, Ru, Ir, Ge, Si and V, x is 1 or 2, and y is 2, 3, 4 or 5; and a fuel electrode and an oxidizing agent electrode arranged to have said electrolyte membrane sandwiched therebetween.

17. The fuel cell according to claim 16, wherein said proton conductive polymer is a polymer having at least one of a sulfonic group and a carboxylic group and a fluorine-containing resin skeleton.

18. The fuel cell according to claim 16, wherein said proton conductive film is doped with an acid.

19. The fuel cell according to claim 16, wherein the amount of the copolymer between the polymer represented by general formula (1) and the metal oxide represented by general formula (2) falls within a range of between 0.001 parts by weight and 60 parts by weight relative to 100 parts by weight on the dry basis of said proton conductive polymer.

20. The fuel cell according to claim 16, wherein said proton conductive film contains the polymer represented by general formula (1) and the amount of said copolymer falls within a range of between 1 part by weight and 500 parts by weight relative to 100 parts by weight of said polymer.

* * * * *